United States Patent
France et al.

(10) Patent No.: US 8,242,955 B2
(45) Date of Patent: Aug. 14, 2012

(54) OUTLIER DETECTION BY CROSS-COMPARISON OF DIFFERENT POSITION SOLUTION TYPES

(75) Inventors: Peter G. France, Christchurch (NZ); Shawn D. Weisenburger, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 489 days.

(21) Appl. No.: 12/433,676

(22) Filed: Apr. 30, 2009

(65) Prior Publication Data
US 2010/0225532 A1    Sep. 9, 2010

Related U.S. Application Data

(60) Provisional application No. 61/158,041, filed on Mar. 6, 2009.

(51) Int. Cl.
G01S 19/22    (2010.01)
G01S 19/21    (2010.01)
G01S 19/32    (2010.01)

(52) U.S. Cl. .......... 342/357.61; 342/357.59; 342/357.72

(58) Field of Classification Search ............. 342/357.23, 342/357.31, 357.72, 357.59, 357.61
See application file for complete search history.

(56) References Cited

U.S. PATENT DOCUMENTS

| 6,144,335 A | 11/2000 | Rogers et al. |
| 6,768,910 B2 * | 7/2004 | Gutowski et al. .......... 455/456.1 |

* cited by examiner

*Primary Examiner* — Jack W Keith
*Assistant Examiner* — Cassie Galt

(57) ABSTRACT

Embodiments provided herein recite methods and systems for an accuracy estimator for a position fix. In one embodiment, a solution receiver for receiving a code solution and at least one additional solution from a different solution technique is utilized. In addition, a table of metric values comprising an associated accuracy estimate for at least one characteristic of each of the code solution and the at least one additional solution is also utilized. A comparator compares the code solution and the at least one additional solution with the table of metric values. In addition, a solution orderer orders the at least one additional solution above or below the code solution dependent on whether the at least one additional solution is within a pre-defined offset distance threshold. If the at least one additional solution is outside of the distance threshold, the code solution is chosen as the final solution.

4 Claims, 5 Drawing Sheets

100

200

```
┌─────────────────────────────────────────────────────────┐
│         Find matching solutions at a given epoch.        │
│                          202                             │
└─────────────────────────────────────────────────────────┘
                            │
                            ▼
┌─────────────────────────────────────────────────────────┐
│  Compute distances between L1 float solution and fixed solution. │
│                          204                             │
└─────────────────────────────────────────────────────────┘
                            │
                            ▼
┌─────────────────────────────────────────────────────────┐
│  If distance > threshold, remove fixed solution from candidates. │
│                          206                             │
└─────────────────────────────────────────────────────────┘
                            │
                            ▼
┌─────────────────────────────────────────────────────────┐
│ Compute metric for remaining carrier solutions and order from best │
│                 accuracy estimate to worst.              │
│                          208                             │
└─────────────────────────────────────────────────────────┘
                            │
                            ▼
┌─────────────────────────────────────────────────────────┐
│   Compute distance between L1 code solution and each carrier │
│                        solution.                         │
│                          210                             │
└─────────────────────────────────────────────────────────┘
                            │
                            ▼
┌─────────────────────────────────────────────────────────┐
│ First carrier solution that is sufficiently close to the code solution │
│   and has a low metric is chosen as best carrier solution. │
│                          212                             │
└─────────────────────────────────────────────────────────┘
                            │
                            ▼
┌─────────────────────────────────────────────────────────┐
│ If the best carrier solution is within 5m of the code solution, │
│       choose it, otherwise choose code solution.         │
│                          214                             │
└─────────────────────────────────────────────────────────┘
```

FIG. 2

OUTLIER DETECTION BY CROSS-COMPARISON OF DIFFERENT POSITION SOLUTION TYPES

CROSS REFERENCE TO RELATED APPLICATION

This application claims priority to the U.S. Provisional Patent Application No. 61/158,041 entitled "OUTLIER DETECTION BY CROSS-COMPARISON OF DIFFERENT POSITION SOLUTION TYPES" by Peter G. France et al., filed Mar. 6, 2009, which is incorporated herein.

TECHNICAL FIELD

Embodiments in accordance with the present invention generally pertain to navigation devices, and particularly to position determination devices.

BACKGROUND

A Navigation satellite system (NSS) is a space based radio positioning network for providing users equipped with suitable receivers highly accurate position, velocity, and time (PVT) information. One of the most recognizable NSS systems is the global positioning system (GPS) developed by the United States of America, although there are numerous other systems including local NSS's that utilize fewer satellites in a geosynchronous orbit. Thus, although the following background describes the operation of the GPS system in particular, it is appreciated that the description is meant to provide a generic overview of NSS operations as opposed to specific reliance on a single NSS.

In general, the space based portion of GPS comprises a constellation of GPS satellites in non-geosynchronous 12-hour orbits around the earth. GPS satellites are located in six orbital planes with four of the GPS satellites in each plane, plus a number of "on orbit" spare satellites for redundancy. The orbital planes of the GPS satellites have an inclination of 55 degrees relative to the equator and an altitude of approximately 20,200 km (10,900 miles) and typically complete an orbit in approximately 12 hours. The positions of GPS satellites are such that a minimum of five of the total constellation of GPS satellites are normally observable (above the horizon) by a user anywhere on earth at any given time.

NSS position determination is based upon a concept referred to as time of flight (TOF) ranging. For example, each of the orbiting GPS satellites broadcasts spread spectrum microwave signals encoded with positioning data and satellite ephemeris information. Essentially, the signals are broadcast at precisely known times and at precisely known intervals. The signals are encoded with their precise time of transmission.

The signal is received at a NSS receiver designed to determine the time of flight from satellite to receiver by synchronizing a local replica of the satellite signal and determining the time of flight of this signal, compare it to the time of transmission, and to demodulate the satellite orbital data contained in the Satellite Data Message. The coded satellite signal contains information describing when the signal was sent from the satellite. The NSS receiver determines the time between transmission of the signal by the satellite and reception by the receiver. Multiplying this by the speed of light gives what is termed the pseudorange measurement of that satellite. It is called a pseudorange because of the many kinds of errors that occur due to clock errors, propagation errors, multipath errors, and the like.

If the NSS receiver clock were perfect, this would be the range measurement for that satellite, but the imperfection of the clock causes it to differ by the time offset between actual time and receiver time. Thus, the measurement is called a pseudorange, rather than a range. However, the time offset is common to the pseudorange measurements of all the satellites. By determining the pseudoranges of four or more satellites, the NSS receiver is able to determine its location in three dimensions, as well the time offset. In addition, because the signal is consistently generated and broadcast, the NSS receiver is able to determine position, velocity, and time (PVT) information on an ongoing basis thereby allowing navigation from point to point.

SUMMARY OF THE INVENTION

Embodiments provided herein recite methods and systems for an accuracy estimator for a position fix. In one embodiment, a solution receiver for receiving a code solution and at least one additional solution from a different solution technique is utilized. In addition, a table of metric values comprising an associated accuracy estimate for at least one characteristic of each of the code solution and the at least one additional solution is also utilized. A comparator compares the code solution and the at least one additional solution with the table of metric values. In addition, a solution orderer orders the at least one additional solution above or below the code solution dependent on whether the at least one additional solution is within a pre-defined offset distance threshold. If the at least one additional solution is outside of the distance threshold, the code solution is chosen as the final solution.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 is a flowchart of a method for providing an improved accuracy estimate of a position fix in a GNSS receiver in accordance with an embodiment of the present invention.

DESCRIPTION OF EMBODIMENTS

Figure 1:
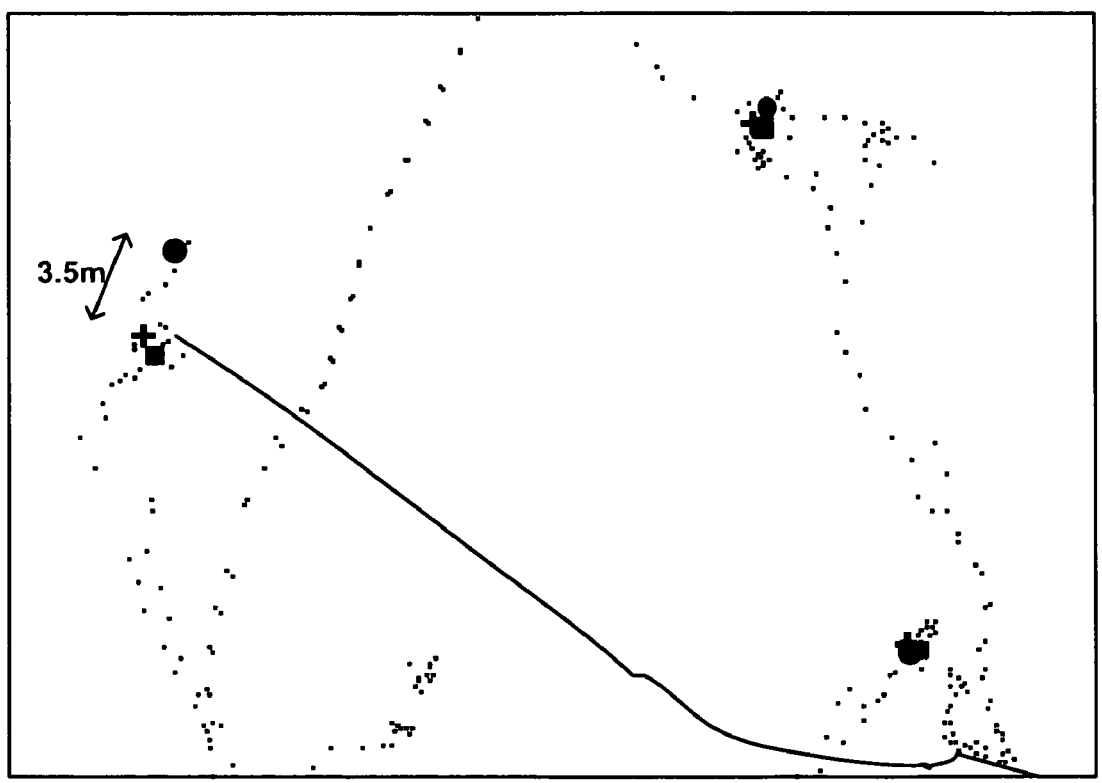
FIG. 1 is a plot diagram of a known location versus an L1-only float solution and an L1/L2 fixed solution with error shown in accordance with one embodiment of the present invention.

Reference will now be made in detail to embodiments of the invention. While the invention will be described in conjunction with the different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the embodiments in accordance with the present invention, numerous specific details are set forth in order to provide a thorough understanding of the embodiments of the present invention. However, the embodiments in accordance with the present invention may be practiced without these specific details. In other instances, well-known methods, procedures, components, and circuits have not been described in detail so as not to unnecessarily obscure aspects of the embodiments in accordance with the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the embodiments in accordance with the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One embodiment described herein relates to GPS Receiver Patents Showing General Functionality as described in detail in U.S. Pat. No. 4,847,862 issued Jul. 11, 1989 and which is assigned to the assignee of the present application, and in U.S. Pat. No. 5,486,834 issued Jan. 23, 1996 which is assigned to the assignee of the present application, and in U.S. Pat. No. 5,621,416 issued Apr. 15, 1997 which is assigned to the assignee of the present application and which are incorporated by reference for all purposes.

Overview

One embodiment looks for errors in the fixed and float carrier solutions. In terms of robustness, code solutions tend to be the most robust, followed by float solutions followed by fixed solutions. Unfortunately, the accuracy of the solutions is the reverse with the code being the worst and the fixed being the best. In other words, using L2 carrier information would normally increase the robustness of the position solutions. However, L2 tracking is complicated by anti-spoofing (AS). As such, tracking these encrypted signals is significantly less reliable than tracking the unencrypted L1 signals and therefore more prone to errors.

Errors in solutions may be due to several factors including, but not limited to:
Multipath/reflected signal
Jamming/interference
Atmospheric error
Software bug
Weak geometry
Erroneous integer ambiguity resolution In one embodiment, the errors in solution variables will affect the L1 code, L1 carrier float, L1/L2 carrier float, and carrier fixed solutions in different ways which are dependent on how each solution is computed. For example, if there is a significant multipath error on one or more signals at the beginning of a test, the carrier float solution may converge on incorrect ambiguities resulting in significant position errors carrying forward even after the multipath has disappeared. In other words, the code solution may have significant errors during this time of high multipath, but once it disappears the solution will quickly recover without continued consequence. In this case, the discrepancy between the two solutions may be used to eliminate the erroneous carrier solution.

With reference to FIG. 1, a plot diagram of an example erroneous solution is shown in accordance with one embodiment. In plot diagram 100, the known truth coordinate is indicated by a cross, an L1/L2 fixed solution is indicated by a circle, and an L1-only float solution is indicated by a square.

Normally, an L1/L2 fixed solution is expected to be better than a float solution. This is true for the two right hand points. However, at the left hand point, the L1 float solution is 0.9 m away from truth, whereas the L1/L2 fixed solution is 3.5 m away. This is an example of a bad initialization, where the wrong integers have been chosen. One embodiment detects such cases and provides a more accurate result by choosing the best solution type from the available choices.

In general, navigation satellite system (NSS) refers to a position determining system that utilizes satellite-based position determining components or possibly a variety of terrestrial-based and satellite-based position determining components to determine a geographic position. In one embodiment, the geographic position provided by the NSS describes the latitude and longitude at the receiving device's location. However, NSS's may also be used to determine elevation, speed, time, and the like. In some cases, the navigation satellite systems are global (e.g., GNSS), however, there are also NSS's that are local (e.g., LNSS). In other words, while NSS's such as global positioning system (GPS) provide global navigation, there are also numerous other satellite systems, that provide only local or fixed location signals. The present technology is well suited for use in GNSS environments, LNSS environments or a combination thereof.

In one embodiment, NSS receivers operate by receiving radio signals provided by any of the group of local and global NSS signal providers including, but not limited to, a GPS signal, a Galileo signal, a Globalnaya Navigatsionnay Sputnikovaya Sistema (GLONASS) signal, the Indian Regional Navigational Satellite System (IRNSS), and a Compass signal. For example, in one embodiment, the satellite navigation signal being received may be, but is not meant to be limited to, L1 signal, E1 signal, E2 signal, L2 signal, L3 signal, E6 signal, B3 signal, LEX signal, L5 signal, and an E5 signal. Furthermore, although signal may be from a satellite based device, the signal may be a signal generated by a device placed in line of sight. In addition to satellite-based positioning signals, an Earth based signal generator often referred to as a pseudolite transmitter, may be used to distribute the previously described signal, particularly in areas where visibility of satellites is obscured such as in deep open-pit mines. The Earth based pseudolite signal generator may be portable or stationary.

Acquisition

In order to track a satellite signal, a GNSS needs to search frequency (doppler) and time (code). The frequency of a given measurement is a function of the antenna velocity, the satellite velocity (combined that makes the doppler) and the receiver frequency error. If the GNSS receiver has no idea where it is and/or where the satellite is along with their velocities, a search over the entire possible doppler range must occur. On top of this, if the GNSS receiver does not know the approximate receiver clock drift (frequency error), the entire possible frequency error must be added to the possible doppler error to create the search range.

However, by knowing the approximate position and velocity, approximate doppler to the satellite can be computed. This can significantly reduce the doppler search space.

In order to track the code, one must know the pseudorange. Pseudorange is a combination of the true range plus the receiver clock bias (plus a few other small errors). So, knowing an approximate position and time helps compute an approximate range to the satellite. This can also reduce the search space considerably. For example, given a single pseudorange measurement in combination with an approximate position, the approximate receiver clock error can be computed, giving fairly precise time. Any precise timing information can be used to skip steps in the signal alignment. For example, if time is known better than 0.5 ms, bit synchronization can be skipped. If time is known better than 10 ms, word synchronization can be skipped, etc. Thus, given pseudorange and doppler measurements along with PVT information, both the time and frequency search spaces can be significantly reduced.

Errors

Broadly speaking, errors in the position provided by a GNSS receiver are due to two factors: the precision with which the distance to each satellite is known, and the geometry of the satellites, e.g., how closely or far apart they're spaced across the sky. Distance errors can be compensated for by using WAAS, post-processing, averaging, and other techniques, but satellite geometry is a fundamental limiting factor. The maximum achievable position accuracy is limited by GPS satellite geometry.

The GPS satellite geometry factor is sometimes represented by a numerical measure known as "Position Dilution of Precision", or PDOP. The higher the PDOP, the greater the possible error in the accuracy of your position; roughly speaking, your total error is the error due to the uncertainty in satellite distance multiplied by the PDOP Approximate user location and approximate satellite locations at a given epoch are needed to compute PDOP. As stated herein, PDOP is essentially a measure of the geometric strength of the network of satellites for a given user location. For example, if all of the satellites (relative to a user at a given point in time) are lined up in the north/south azimuth with little variation from this line, the ability to solve the user's position in the north/south direction is quite strong, but the ability to solve the user's position in the east/west direction is weak. This would result in a large PDOP. If the satellites were distributed more evenly throughout the sky, the PDOP would be low indicating geometric strength and the ability to solve for the user's position in all directions.

PDOP calculations are known in the arts and are routinely calculated in current GNSS receivers. See Misra & Enge, Global Positioning System, Second Edition, p. 208 ff, Ganga-Jamuna Press, 2006, ISBN 0-9709544-1-7.

Normally, PDOP calculations are accompanied by a signal to noise ratio (SNR). Typically, SNR is provided in units of dBHz (dB in a 1 Hz bandwidth). For example, in one embodiment, threshold acquisition may be at or around 27 dB-Hz while the tracking threshold is approximately 20 dB-Hz.

In one embodiment, an attempt to acquire may be from a cold start (e.g., no initialization), a warm start (e.g., approx. 50% initialization), or a hot start (e.g., approximately 95% initialization). Acquisition refers to synchronizing a local code phase generator with the code phase of a given satellite signal, thus tracking the code phase, and optionally synchronizing another local oscillator with the carrier phase, and demodulating the satellite data message from a pseudorandom-noise (PRN) code. Synchronization of the code phase allows for further synchronizing of the local clock signal in the receiver.

Comparing the local clock time of synchronization to the transmitted time provides the time of flight of the signal from the satellite to the receiver, which in turn provides the pseudorange for that satellite at that instant of time. This pseudorange is then delivered to a position, velocity, and time (PVT) processor along with other pseudoranges measured from other satellites in view of the receiver, and processed by the PVT processor to deliver a location solution with position, velocity, and time as an output of the receiver, or PVT data. This kind of processing of pseudoranges to obtain a position fix is well-known in the global positioning arts since its introduction in 1972.

Operation

One embodiment involves calculating position solutions by a variety of techniques, and comparing the results. Various heuristics are used to identify possible errors in the higher-accuracy solutions, in which case a lower accuracy solution is output. This technique may be applied to post-processed results, but can also be applied in real time.

In general, the solution techniques can include at least, code, fixed-integer static, fixed-integer kinematic, float static and float kinematic of either a single frequency or two or more frequencies used in combination. In one embodiment, the one or more frequencies referred to herein may be any frequencies that is transmitted from a satellite system. For purposes of clarity, the present discussion utilizes the L1, L2 and L5 frequencies in the examples. However, the utilization of the L1, L2 and L5 frequencies herein is provided for exemplary purposes only and is should be understood that another frequency transmitted from a satellite system may be used in addition or in place of the L1, L2 and L5 frequencies utilized in the examples provided herein.

In one embodiment, kinematic refers to an antenna that is moving. The integer ambiguity resolution techniques need to take this into account. Static techniques make the additional assumption that the antenna is stationary (with respect to Earth), which provides additional useful constraints that assist in resolving the integers more quickly and robustly.

However, if the static assumption is not true, then errors often result. For example, while measuring a location an antenna should remain static. If movement occurs before ending the "static" occupation, errors as large as 100 meters in magnitude in the position solution may occur. Thus, in one embodiment, the solution method described herein compares the static solution with the equivalent kinematic solution.

In one embodiment, integers can be resolved using a single frequency such as, for example, L1 GPS. Some receivers only collect this single frequency. However, if two or more frequencies are measured the integers may be resolved much more quickly and robustly. One concern is that L2 is weaker and more prone to error and dropouts. As such, an erroneous L2 measurement can result in a bad integer fix.

In another embodiment, there may be only 3 or 4 L1/L2 measurements available, resulting in a solution with large PDOP, whereas there may be 7 good L1 measurements. In this case, it is useful to calculate an L1-only solution as a comparison. During the comparison, if the solutions don't agree it will indicate a potential problem.

For purposes of clarity, the solution techniques are divided into 4 categories:
Code tracking vs. carrier phase tracking;
Static vs. kinematic ambiguity resolution solutions;
Float vs. fixed ambiguity resolution solutions; and
Single frequency vs. combination (or multiple) frequency measurements.

These categories form the basis for the solution techniques referenced herein. Furthermore, it is appreciated that the most-used solution techniques may also include combinations of the following described methods.

Code Tracking vs. Phase Tracking Solutions
Code Solution

This is the original and basic method for using GPS signals to determine a position using measurements of the code phase of the signals. It is the least accurate in terms of position fix. Code phase for a single frequency signal, L1, is acquired and tracked, and timing and ephemeris information is extracted from the signal that allows the receiver to determine a position fix. See Global Positioning System: Theory and Applications Vol. I, Part I, Chapter 3 GPS Signal Structure and Theoretical Performance, p. 57-119, Chapter 8 GPS Receivers, p. 329-405, and Chapter 9, GPS Navigation Algorithms, p. 409-433. Edited by Parkinson & Spilker, Volume 163, 1996. ISBN 1 56347-106-X. American Institute of Aeronautics and Astronautics, Inc.

Carrier Phase Tracking Solution

Measurements of carrier phase improve the accuracy of the position fix, because the wavelength of the L1 carrier signal is 19 cm, much shorter than the equivalent wavelength of the code signal. However, there are no markers to allow a receiver to distinguish between one carrier wavelength and another. This requires the receiver to make an estimate of the initial number carrier wavelengths at the start of initial carrier tracking for each satellite, and then add the fractional wavelength the receiver can actually measure. This measurement produces the carrier pseudorange (real range plus clock error, plus other errors). Determining this integer number is referred to as "resolving the integer ambiguities." There are many ways to do this, as described in the literature. See Pratap and Enge, Global Positioning System, Second Edition, Chapter 7 Precise Positioning with Carrier Phase, para. 7.1, pp 231 ff. ISBN 0-9709544-1-7. Ganga-Jamuna Press. U.S. Pat. No. 5,359,332 entitled "Determination of Phase Ambiguities in Satellite Ranges" is also incorporated by reference herein and is assigned to the current assignee of this application.

Static vs. kinematic Ambiguity Resolution

The ambiguity resolution process may be done in a static mode, where two receivers are held in their respective locations until resolution is achieved, or in a "kinematic" mode, where the roving receiver, can move about relative to the reference receiver (which may or may not be static). See Pratap and Enge, Global Positioning System, Second Edition, Chapter 7 Precise Positioning with Carrier Phase, para. 7.5.2, pp 241 ISBN 0-9709544-1-7 for a discussion of static and kinematic solutions. Kinematic solutions are often called "on-the-fly" solutions, and are described in Hwang, Patrick Y.

C. (1991). Kinematic GPS for Differential Positioning: Resolving Integer Ambiguities on the Fly, Navigation, vol. 38, no. 1, pp. 1-15.

U.S. Pat. No. 5,519 620 entitled "Centimeter Accurate Global Position System Receiver for On-The-Fly Real-Time Kinematic Measurements and Control" is hereby incorporated by reference herein and is assigned to the same assignee of this application. U.S. Pat. No. 7,312,747 entitled "Multiple GNSS and FDMA high precision carrier-phase based positioning" in incorporated by reference herein and is assigned to the same assignee of this application.

Float vs. Fixed Ambiguity Resolution Solutions

Algorithms have been developed to process the measurements in batch or sequential mode to estimate the ambiguities as though they were real-valued, commonly known as floating-point numbers, or a "float solution." See Pratap and Enge, Global Positioning System, Second Edition, Chapter 7, para. 7.5.2 Float Solution, p. 261 ISBN 0-9709544-1-7.

Fixed ambiguity solutions refer to solutions whereby the ambiguities are estimated as integers. The act of fixing the ambiguities to integer values is often treated as a follow-on step to computing them as float values using some estimation technique such as Kalman filtering or least squares. In its simplest form, fixing the ambiguities to integers could be simply rounding the floating ambiguities to the nearest integers. See Hofmann-Wellenhof, Lichtenegger, and Collins, GPS Theory and Practice $2^{nd}$ Ed. Chapter 7.4 In situ data processing, p 145.

Single Frequency vs. Multiple Frequency Measurements

L1 refers to the civilian signal available to anyone for performing position determination via GPS signaling. L1=1575.42 MHz. Single frequency operation is widely used, and without corrections, achieves a basic accuracy on the order of 4-7 meters.

L1/L2 refers to the use of a dual-frequency receiver which can track carrier phase at each of the two GPS signal frequencies, L1=1575.42 MHz, and L2=1227.6 MHz. Tracking 2 carriers which are controlled by a common source oscillator permits the use of linear combinations which assist in the reliable estimation of the integer ambiguities as well as the elimination of frequency-dependent ionospheric effects that cause an error in the pseudorange (see Hofmann-Wellenhof, Lichtenegger, and Collins, GPS Theory and Practice $2^{nd}$ Ed. Chapter 9.1.3 Ambiguity resolution, p 145.). More data can be extracted when more satellite signal frequencies are used, such as L5 or L3. U.S. Pat. No. 7,312,747 entitled "Ambiguity Estimation of GNSS Signals for Three or More Carriers" to Vollath is hereby incorporated by reference herein, and is assigned to the same assignee as this application.

In one embodiment, "Float static" refers to the process of performing an initialization where the receiver is kept at a constant fixed position until the ambiguities have been resolved. "Float kinematic" refers to the process of doing this ambiguity resolution "on the fly," while the receiver is being moved from one point to another by a GIS or survey professional.

The heuristics of how to identify bad solutions include looking at distances between L1/L2-fixed and L1-float (to catch bad L2 influence), and distances between static and kinematic solutions to catch static bugs (and non-stationary inputs!). In one embodiment, carrier solutions are replaced with code solutions, depending on a metric based on DOP, estimated accuracy, carrier lock duration, and distance between code and carrier solutions.

One embodiment for dropping back to a code solution if the carrier solution completely fails is described in detail in U.S. Pat. No. 6,144,335 entitled "Automatic Differential Correction Processing of field data in a Global Positioning System" which is incorporated by reference herein and is assigned to the assignee of the present application.

Method

With reference now to FIG. 2, a flowchart 200 of a method for providing an improved accuracy estimate of a position fix in a GNSS receiver is shown in accordance with an embodiment of the present invention. At 202-206 of flowchart 200, one embodiment attempts to remove incorrect fixed integer solutions.

With reference now to 202 of FIG. 2, one embodiment finds matching L1 float, L1/L2 float, and fixed solution (could be L1 or L1/L2) for a given epoch. In addition, a minimum distance threshold between the fixed solution and the L1 float solution is defined. In one embodiment, the minimum distance threshold is based on the difference between the L1 float and L1/L2 float solutions. If they agree closely (<=10 cm), the minimum threshold is set to 20 cm, otherwise it is set to 30 cm.

Referring now to 204 of FIG. 2, one embodiment computes the maximum distance threshold between the fixed solution and the L1 float solution. This is the maximum of the minimum threshold computed in (2) and the 3*L1_float_position_uncertainty. MaxDistThreshold=max (MinThreshold, 3*L1FloatPositionUncertainty). The float position uncertainty is estimated as part of the position estimation. This is typically done using either weighted least squares or a Kalman filter.

For example, if the L1 and L1/L2 float solutions closely agree, the minimum threshold will be 20 cm. Assuming the L1 float uncertainty is 35 cm, the maximum distance threshold would be 3*35 cm=105 cm. If on the other hand the L1 float uncertainty is 4 cm, the maximum distance threshold would be 20 cm because 3*4 cm=12 cm which is less than 20 cm from 202.

With reference now to 206 of FIG. 2, in one embodiment, if the distance difference between the L1 float solution and the fixed solution is>the threshold computed at 204, the fixed solution is assumed to be in error (likely due to incorrect ambiguity resolution) and is removed from the candidate solutions at that epoch.

The following example describes one embodiment for generating the metric. The specific values and thresholds used are based on empirical testing.

```
PDOP metric
If(CarrierPDOP > CodePDOP)
    PDOPMetric = min( (CarrierPDOP − CodePDOP)/10, 1.0 )
Else
    PDOPMetric = 0
Carrier lock duration metric (CLDM)
If(CarrierLockDuration > 120)
    CLDM = 0;
Else if(CarrierLockDuration > 60)
    CLDM = (120 − CarrierLockDuration)*(0.25/60.0)
Else if(CarrierLockDuration > 30)
    CLDM = (60 − CarrierLockDuration)*(0.25/30.0) + 0.25
Else
    CLDM = (30 − CarrierLockDuration)*(0.5/30.0) + 0.5
Estimated accuracy metric (EAM)
    if(CodeEstAcc < CarrierEstAcc)
    {
        if(CarrierEstAcc > 2.0 && CarrierEstAcc > 1.2*CodeEstAcc)
        {
            EAM = 2 // use code solution
        }
        if(CarrierEstAcc > 1.0 && CarrierEstAcc > 1.5*CodeEstAcc)
        {
            EAM = 2 // use code solution
        }
        EAM = (CarrierEstAcc − CodeEstAcc)*0.5
    }
    Else
        EAM = 0;
    Total Metric
Metric = PDOPMetric + CDLM + EAM
```

In general, carrier solutions with a lower metric are considered more robust than those with a higher metric.

Table 1 below provides an example chart for each metric associated with fixed integer solutions.

TABLE 1

| Solution | PDOP Metric | CLDM | EAM | Total Metric |
|---|---|---|---|---|
| Combination Fixed-Integer | 0.2 | 0.45 | 0 | 0.65 |
| Combination Float Static | 0.2 | 0.45 | 0 | 0.65 |
| Combination Float Kinematic | 0.2 | 0.45 | 0 | 0.65 |
| Float Static | 0.1 | 0 | 0 | 0.1 |
| Float Kinematic | 0.1 | 0 | 0 | 0.1 |

Referring now to 208 of FIG. 2, one embodiment computes a metric for remaining carrier solutions and orders them from best estimated accuracy to worst.

At 210-214 of flowchart 200, one embodiment tests the carrier solutions against the code solution. With reference now to 210 of FIG. 2, a distance between the code solution and each carrier solution is computed. In addition, a threshold for the distance between the carrier and code solutions is chosen. This is based on the estimated code accuracy and estimated carrier accuracy. For example, Threshold=max (3*CodeEstimatedAccuracy, 3*CarrierEstimatedAccuracy)

Referring now to 212 of FIG. 2, in one embodiment the first carrier solution to agree with the code solution within the threshold and has a metric below a predetermined value (say 1.6) is chosen as the best carrier solution at that epoch. If no carrier solutions agree with the code solution, the code solution is chosen as the final solution at that epoch.

With reference now to 214 of FIG. 2, in one embodiment if the remaining carrier and code solutions are sufficiently close (say 5 m), the carrier solution is chosen, otherwise the code solution is chosen as the final solution at that epoch.

Table 2 below provides a testing order solution.

TABLE 2

| Solution | Estimated Accuracy | Solution Order |
|---|---|---|
| Code | 25 cm | baseline |
| Combination Fixed-Integer | 1 cm | 1 |
| Combination Float Static | 3 cm | 2 |
| Combination Float Kinematic | 5 cm | 4 |
| Float Static | 3.5 cm | 3 |
| Float Kinematic | 28 cm | removed |

In one embodiment, the above method may be enhanced by doing further consistency checks between the carrier solutions. Also, if a dual frequency code solution were computed, it could be also be added into the mix as well.

Moreover, if more signals became available, for example GPS L5, this would give an additional carrier measurement which could be used to compute an L5 float solution, an L1/L5 float solution, an L2/L5 float solution, an L1/L2/L5 solution, as well as their fixed integer solutions where possible. Also, an L5 code solution and combined code solutions could be computed. In another embodiment, the method could be generalized to look for consistency/irregularities between the many solutions.

Figure 3:
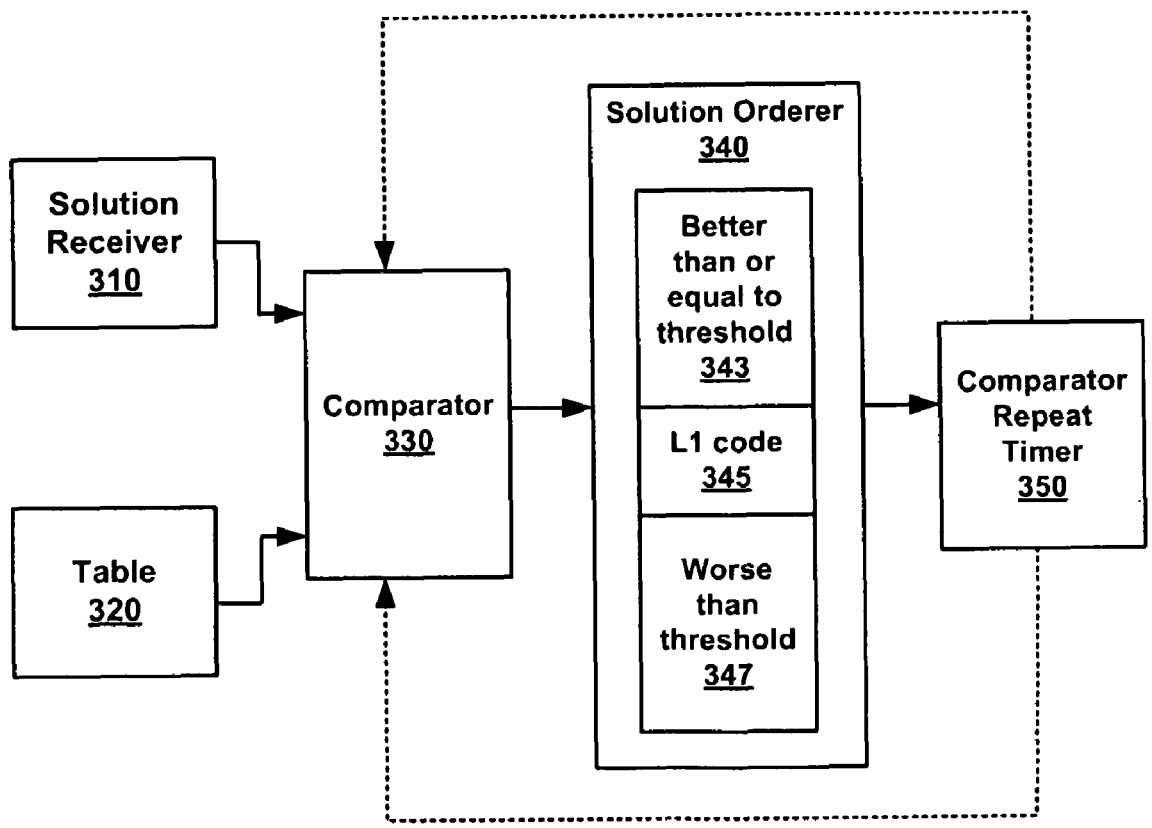
FIG. 3 is a block diagram of an improved accuracy estimator in accordance with an embodiment of the present invention.

With reference now to FIG. 3, a block diagram of an improved accuracy estimator 300 is shown in accordance with an embodiment of the present invention.

In one embodiment, improved accuracy estimator 300 includes a solution receiver 310, a table 320, a comparator 330 a solution orderer 340 and an optional comparator repeat timer 350. In one embodiment, solution orderer 340 includes a better than or equal to threshold 343 portion, an L1 code 345 portion and a worse than threshold 347 portion.

Solution receiver 310 receives a code solution and at least one additional solution from a different solution technique. For example, as described herein, the code solution may be an L1 solution while at least one additional solution is selected from the group of solution techniques including, but not limited to, L1/L2 fixed-integer static, L1/L2 fixed-integer kinematic, L1 fixed-integer static, L1 fixed-integer kinematic, L1/L2 float static, L1/L2 float kinematic, L1 float static, L1 float kinematic, and L1 code.

In another embodiment, solution receiver 310 will receive a plurality of additional solutions from a plurality of different solution techniques. For example, solution receiver 310 may receiver solutions from any or all of the solution techniques including, but not limited to, L1/L2 fixed-integer static, L1/L2 fixed-integer kinematic, L1 fixed-integer static, L1 fixed-integer kinematic, L1/L2 float static, L1/L2 float kinematic, L1 float static, L1 float kinematic, and L1 code.

In one embodiment, table 320 is a table of metric values such as Tables 1 and 2 provided herein. Table 320 may include an associated accuracy estimate for each of the code solution and the at least one additional solution. The at least one characteristic of each solution may be selected from the group including, but not limited to, a PDOP, an estimated accuracy, and a carrier lock duration.

Comparator 330 then compares the code solution and the at least one additional solution with the table of metric values of the code solution and the at least one additional solution.

In one embodiment, solution orderer 340 orders the at least one additional solution above or below the code solution dependent on whether the at least one additional solution is within a pre-defined offset distance threshold, wherein if the at least one additional solution is outside of the distance threshold, the code solution is chosen as the final solution. In one embodiment, a pre-defined number of user-selectable allowable error range limits may be provided for the final solution.

For example, a user may select an allowable error range limit such as 25 centimeters. In so doing, if the final solution is not within the selected allowable error range limit then no solution would be provided, or the solution may be provided with an indication that it is outside of the user selected allowable range of accuracy.

In one embodiment, the allowable error range limits may be a selection of previously provided settings such as, for example, a list of options such as: 5, 10, 15, 20, 50, 67, 100 centimeters, or the like. In another embodiment, a range of user-selectable allowable error limit values may be provided. For example, a user may be able to select any value within the range of 0-115 centimeters as an accuracy requirement for the final solution.

For example, solution orderer 340 includes a better than or equal to threshold 343 portion, an L1 code 345 portion and a worse than threshold 347 portion. Thus, if the at least one additional solution is within the threshold, then the at least one additional solution will be placed in the better than or equal to threshold 343 portion. Similarly, if the at least one additional solution is outside of the threshold, then the at least one additional solution will be placed in the worse than threshold 347 portion. This ordering may be performed for each additional solution that is received. Thus, in one embodiment, the solution orderer 340 will provide a listing of every additional solution received and its position with respect to the pre-defined offset threshold.

In another embodiment, the solution orderer 340 will stop receiving and organizing any additional solutions after a first additional solution is placed in the better than or equal to threshold 343 portion. In yet another embodiment, solution orderer 340 will stop receiving and organizing any additional solutions after a pre-defined number of additional solutions are placed in the better than or equal to threshold 343 portion.

In one embodiment, solution orderer 340 also includes a threshold adjuster to calculate the difference between an L1 float and an L1/L2 float solutions. If they agree within the predefined distance threshold, then the minimum threshold is set to approximately 20 cm. Otherwise, in one embodiment, the minimum threshold is set to approximately 30 cm.

Comparator repeat timer 350 is utilized, in one embodiment, to signal both the comparator 330 and the solution orderer 340 to repeat the compares and the ordering after a pre-defined number of epochs. For example, comparator repeat timer 350 may be pre-defined to provide a repeat signal after every epoch, after every other epoch, after every third epoch, etc.

EXAMPLE COMPUTING SYSTEM

Figure 4:
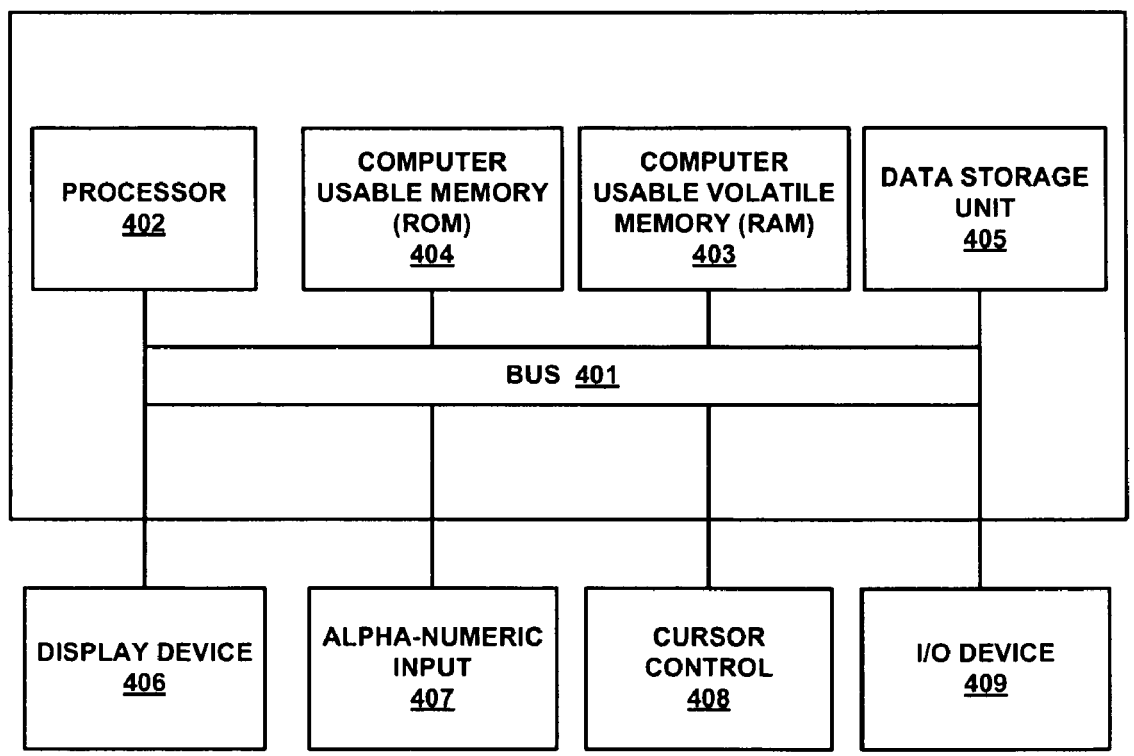
FIG. 4 is a block diagram of a computer system in accordance with an embodiment of the present invention.

Referring now to FIG. 4, a diagram of computer system 400 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 400 and executed by processor 402 of system 400. When executed, the instructions cause the computer system 400 to perform specific functions and exhibit specific behavior as described.

In general, computer system 400 used by the embodiments of the present invention comprises an address/data bus 401 for communicating information, one or more central processors 402 coupled with the bus 401 for processing information and instructions, a computer readable volatile memory unit 403 (e.g., random access memory, static RAM, dynamic, RAM, etc.) coupled with the bus 401 for storing information and instructions for the central processor(s) 402, a computer readable non-volatile memory unit 404 (e.g., read only memory, programmable ROM, flash memory, EPROM, EEPROM, etc.) coupled with the bus 401 for storing static information and instructions for the processor(s) 402.

System 400 also includes a mass storage computer readable data storage device 405 such as a magnetic or optical disk and disk drive coupled with the bus 401 for storing information and instructions. Optionally, system 400 can include a display device 406 coupled to the bus 401 for displaying information to the computer user (e.g., maintenance technician, etc.), an alphanumeric input device 407 including alphanumeric and function keys coupled to the bus 401 for communicating information and command selections to the central processor(s) 402, a cursor control device 408 coupled to the bus for communicating user input information and command selections to the central processor(s) 402, and a signal generating input/output device 409 coupled to the bus 401 for communicating command selections to the processor(s) 402.

EXAMPLE GNSS RECEIVER

Figure 5:
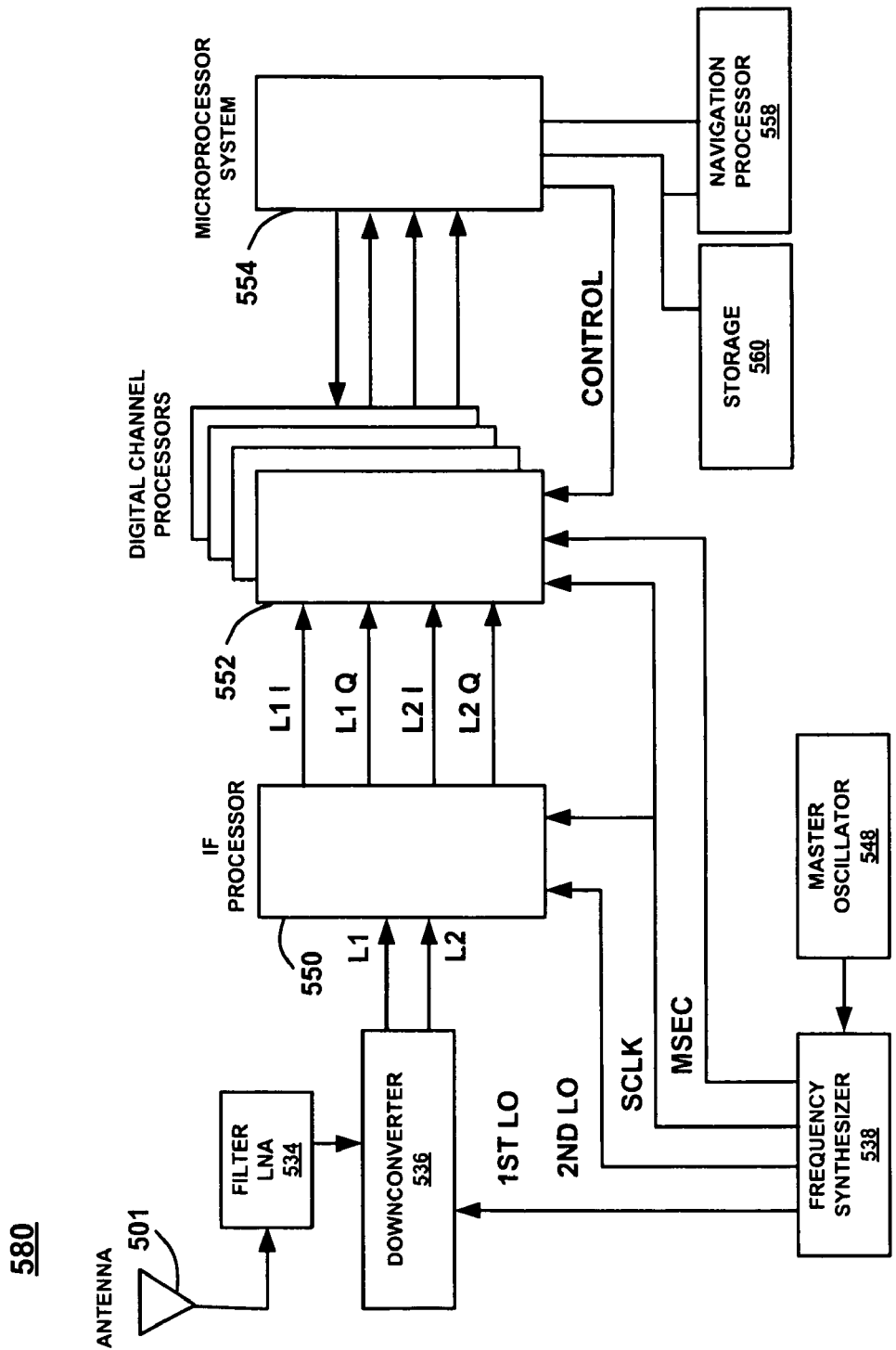
FIG. 5 is a block diagram of an example NSS receiver which may be used in accordance with an embodiment of the present invention.

With reference now to FIG. 5, a block diagram is shown of an embodiment of an example GNSS receiver which may be used in accordance with various embodiments described herein. In particular, FIG. 5 illustrates a block diagram of a GNSS receiver in the form of a general purpose GPS receiver 580 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 580 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 580 of FIG. 5.

In FIG. 5, received L1 and L2 signal is generated by at least one GPS satellite. Each GPS satellite generates different signal L1 and L2 signals and they are processed by different digital channel processors 552 which operate in the same way as one another. FIG. 5 shows GPS signals (L1=1575.42 MHz, L2=1227.60 MHz) entering GPS receiver 580 through a dual frequency antenna 501. Antenna 501 may be a magnetically mountable model commercially available from Trimble® Navigation of Sunnyvale, Calif., 94085. Master oscillator 548 provides the reference oscillator which drives all other clocks in the system. Frequency synthesizer 538 takes the output of master oscillator 548 and generates important clock and local oscillator frequencies used throughout the system. For example, in one embodiment frequency synthesizer 538 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 534 performs filtering and low noise amplification of both L1 and L2 signals. The noise figure of GPS receiver 580 is dictated by the performance of the filter/LNA combination. The downconverter 536 mixes both L1 and L2 signals in frequency down to approximately 175 MHz and outputs the analogue L1 and L2 signals into an IF (intermediate frequency) processor 30. IF processor 550 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 552 inputs the digitally sampled L1 and L2 inphase and quadrature signals. All digital channel processors 552 are typically are identical by design and typically operate on identical input samples. Each digital channel processor 552 is designed to digitally track the L1 and L2 signals produced by one satellite by tracking code and carrier signals and to form code and carrier phase measurements in conjunction with the microprocessor system 554. One digital channel processor 552 is capable of tracking one satellite in both L1 and L2 channels.

Microprocessor system 554 is a general purpose computing device which facilitates tracking and measurements processes, providing pseudorange and carrier phase measurements for a navigation processor 558. In one embodiment, microprocessor system 554 provides signals to control the operation of one or more digital channel processors 552. Navigation processor 558 performs the higher level function of combining measurements in such a way as to produce position, velocity and time information for the differential and surveying functions. Storage 560 is coupled with navigation processor 558 and microprocessor system 554. It is appreciated that storage 560 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Thus, embodiments described herein calculate position solutions by a variety of techniques, and compare the results. Various heuristics are used to identify possible errors in the higher-accuracy solutions, in which case a lower accuracy solution is output.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application.

What is claimed is:

1. A method for providing an improved accuracy estimate of a position fix, the method comprising:
    calculating, at a global navigation satellite system receiver, a series of matching position fixes for a given epoch utilizing an L1 code solution technique and at least one of a plurality of solution techniques selected from the group of solution techniques consisting of: an L1/L2 fixed-integer static solution technique, an L1/L2 fixed-integer kinematic solution technique, an L1 fixed-integer static solution technique, an L1 fixed-integer kinematic solution technique, an L1/L2 float static solution technique, an L1/L2 float kinematic solution technique, an L1 float static solution technique, and an L1 float kinematic solution technique;
    computing, at said global navigation satellite system receiver, a table of metrics for each of said series of matching position fixes for said given epoch, said table of metrics including at least:
        a position dilution of precision metric for each of said series of matching position fixes;
        a carrier lock duration metric for each of said series of matching position fixes;
        an estimated accuracy metric for each of said series of matching position fixes; and
        a summed total metric for each of said series of matching position fixes; and
    utilizing, at said global navigation satellite system receiver, said table of metrics as associated accuracy metrics for estimating accuracies of said series of matching position fixes in comparison to one another.

2. The method of claim 1 further comprising:
performing the method in real time at said global navigation satellite system receiver.

3. The method of claim 1 further comprising:
performing the method upon post-processed results at said global navigation satellite system receiver.

4. The method of claim 1 further comprising:
computing, at said global navigation satellite system receiver, the table of metric values at each epoch.

\* \* \* \* \*